United States Patent
Pedersen et al.

(10) Patent No.: US 12,479,489 B2
(45) Date of Patent: Nov. 25, 2025

(54) SHOPPING CART WITH BAG SUPPORT SYSTEM

(71) Applicant: TARGET BRANDS, INC, Minneapolis, MN (US)

(72) Inventors: Sara L. Pedersen, Minneapolis, MN (US); Alex K. Poniatowski, New Hope, MN (US); Hermann Eichele, Leipheim (DE); Stefan Remmele, Offingen (DE); Dieter Stöckle, Landensberg (DE); Thomas Gasche, Leipheim (DE); Peter Irlbacher, Schwarzenfeld (DE); Johann Daminger, Neu-Ulm (DE); William Kiser, Lincolnton, NC (US)

(73) Assignee: TARGET BRANDS, INC, Minneapolis, MN (US)

( * ) Notice: Subject to any disclaimer, the term of this patent is extended or adjusted under 35 U.S.C. 154(b) by 0 days.

(21) Appl. No.: 18/383,834

(22) Filed: Oct. 25, 2023

(65) Prior Publication Data
US 2025/0136163 A1    May 1, 2025

Related U.S. Application Data

(60) Provisional application No. 63/419,321, filed on Oct. 25, 2022.

(51) Int. Cl.
*B62B 3/14*    (2006.01)

(52) U.S. Cl.
CPC ............ *B62B 3/146* (2013.01); *B62B 3/1444* (2013.01)

(58) Field of Classification Search
CPC ...... B62B 3/146; B62B 3/1464; B62B 3/1444
See application file for complete search history.

(56) References Cited

U.S. PATENT DOCUMENTS

| 2,920,900 A | 1/1960 | Best |
| 3,048,420 A | 8/1962 | Umanoff |

(Continued)

FOREIGN PATENT DOCUMENTS

| CA | 153457 A | 2/1914 |
| CH | 630856 | 7/1982 |

(Continued)

OTHER PUBLICATIONS

Target shopping cart target gift card with photo of shopping cart, retrieved May 7, 2024, https://www.target.com/p/target-shopping-cart-10-target-giftcard/-/A-90247833 (Year: 2024).

(Continued)

*Primary Examiner* — Brian L Swenson
(74) *Attorney, Agent, or Firm* — Griffiths & Seaton PLLC; JoAnn M. Seaton

(57) ABSTRACT

A shopping cart includes a wheeled base and a basket. The basket is supported above a wheeled base and includes a hook. The basket defines a compartment, a top mouth open to the compartment, and an open slot positioned below the top mouth. The open slot is defined between a top edge and a bottom edge thereof, and the bottom edge is positioned opposite the top edge. The hook downwardly depends from the top edge of the open slot toward the bottom edge of the open slot to a free bottom end of the hook. The hook is configured to selectively receive a handle of a bag after the handle of the bag is wrapped around a portion of the basket defined between the open slot and the top mouth of the compartment, such that the bag selectively hangs along an outside surface of the basket opposite the compartment.

18 Claims, 9 Drawing Sheets

(56) References Cited

U.S. PATENT DOCUMENTS

| | | |
|---|---|---|
| 4,560,096 A | 12/1985 | Lucas et al. |
| 4,576,388 A | 3/1986 | Pope |
| D283,264 S | 4/1986 | Strasbourg |
| 4,647,055 A | 3/1987 | Weill |
| 4,682,782 A | 7/1987 | Mills |
| D294,419 S | 2/1988 | Rehrig |
| D296,259 S | 6/1988 | Rehrig |
| D303,305 S | 9/1989 | Deacon |
| 4,923,202 A | 5/1990 | Breveglieri et al. |
| 4,974,799 A | 12/1990 | Palmer |
| 5,012,966 A | 5/1991 | Turner et al. |
| D321,577 S | 11/1991 | Ellis et al. |
| 5,074,570 A | 12/1991 | Ferris et al. |
| 5,131,669 A | 7/1992 | Kinnamon et al. |
| D328,812 S | 8/1992 | Pritchett |
| 5,137,295 A | 8/1992 | Peek |
| 5,154,330 A | 10/1992 | Haynes |
| 5,181,733 A | 1/1993 | Tague |
| 5,199,728 A | 4/1993 | James |
| 5,211,410 A | 5/1993 | Trubiano |
| 5,316,328 A | 5/1994 | Bussinger |
| 5,385,357 A | 1/1995 | Trubiano |
| D357,784 S | 4/1995 | Ince |
| 5,464,183 A | 11/1995 | Mcconnell et al. |
| 5,465,988 A | 11/1995 | Dennis |
| 5,505,472 A | 4/1996 | Trubiano |
| D379,706 S | 6/1997 | Hurst |
| D379,834 S | 6/1997 | Huang |
| 5,651,557 A | 7/1997 | De |
| D383,284 S | 9/1997 | Lines |
| 5,678,842 A | 10/1997 | Hook et al. |
| 5,702,114 A | 12/1997 | Downing et al. |
| 5,821,512 A | 10/1998 | O'hagan et al. |
| 5,821,513 A | 10/1998 | O'Hagan et al. |
| D400,678 S | 11/1998 | Clark et al. |
| 5,836,422 A | 11/1998 | Hurst |
| D404,880 S | 1/1999 | Chipperfield |
| D417,763 S | 12/1999 | Monem |
| D417,937 S | 12/1999 | Harris |
| 6,003,894 A | 12/1999 | Maher |
| 6,041,876 A | 3/2000 | Pulver et al. |
| D423,176 S | 4/2000 | Cherry et al. |
| 6,092,767 A | 7/2000 | Schrager |
| 6,098,999 A | 8/2000 | Anastasia et al. |
| 6,186,382 B1 | 2/2001 | Bergin et al. |
| 6,186,521 B1 | 2/2001 | Divoky et al. |
| 6,199,878 B1 | 3/2001 | Masserant et al. |
| D443,968 S | 6/2001 | Porter |
| D445,230 S | 7/2001 | Deal et al. |
| D445,231 S | 7/2001 | Porter |
| 6,311,941 B1 | 11/2001 | Feldmeyer |
| 6,364,325 B1 | 4/2002 | Chalfant |
| 6,390,422 B2 | 5/2002 | Banko |
| 6,422,580 B1 | 7/2002 | Hunter |
| 6,453,588 B1 | 9/2002 | Lykens |
| 6,464,238 B2 | 10/2002 | Reiland et al. |
| 6,497,423 B1 | 12/2002 | Perelli et al. |
| D470,292 S | 2/2003 | Johnson et al. |
| 6,540,240 B2 | 4/2003 | Nadeau et al. |
| 6,626,631 B1 | 9/2003 | Malakiman |
| D482,172 S | 11/2003 | Johnson |
| D482,836 S | 11/2003 | Van Landingham, Jr. et al. |
| 6,676,139 B1 | 1/2004 | Saccani |
| D492,829 S | 7/2004 | Babkes et al. |
| D493,594 S | 7/2004 | Prather et al. |
| 6,761,364 B2 | 7/2004 | Murar et al. |
| 6,827,357 B2 | 12/2004 | Calmeise et al. |
| 6,832,768 B2 | 12/2004 | Duchene et al. |
| 6,860,494 B1 | 3/2005 | Chisholm |
| 6,926,291 B1 | 8/2005 | John |
| 6,966,565 B1 | 11/2005 | Ryan et al. |
| 6,981,708 B1 | 1/2006 | Tucker et al. |
| 7,063,337 B2 | 6/2006 | Russell et al. |
| D528,870 S | 9/2006 | Ryan |
| 7,104,552 B2 | 9/2006 | Swanson et al. |
| D530,478 S | 10/2006 | Splain et al. |
| D536,502 S | 2/2007 | Weigand et al. |
| 7,182,349 B2 | 2/2007 | Prather et al. |
| D540,998 S | 4/2007 | Splain et al. |
| 7,225,903 B2 | 6/2007 | Nebolon et al. |
| 7,234,711 B2 | 6/2007 | Gordon et al. |
| D546,021 S | 7/2007 | Splain et al. |
| D547,023 S | 7/2007 | Buerchner et al. |
| 7,237,782 B2 | 7/2007 | Tucker et al. |
| D550,423 S | 9/2007 | Spalin et al. |
| 7,287,764 B2 | 10/2007 | Russell et al. |
| D556,413 S | 11/2007 | Splain et al. |
| 7,350,788 B2 | 4/2008 | Booker |
| 7,384,049 B2 | 6/2008 | Peota et al. |
| 7,392,992 B2 | 7/2008 | Stone et al. |
| 7,396,025 B2 | 7/2008 | Ondrasik |
| 7,398,976 B2 | 7/2008 | Splain et al. |
| D575,472 S | 8/2008 | Splain et al. |
| 7,407,169 B2 | 8/2008 | Splain et al. |
| 7,410,178 B2 | 8/2008 | Splain et al. |
| 7,416,194 B2 | 8/2008 | Splain et al. |
| 7,443,295 B2 | 10/2008 | Brice et al. |
| D582,122 S | 12/2008 | Splain et al. |
| D583,523 S | 12/2008 | Deal et al. |
| 7,494,135 B2 | 2/2009 | Ash et al. |
| D588,774 S | 3/2009 | Peota et al. |
| D588,775 S | 3/2009 | Peota et al. |
| D589,852 S | 4/2009 | Giampavolo |
| D591,474 S | 4/2009 | Peota et al. |
| 7,600,763 B2 | 10/2009 | Splain et al. |
| D607,173 S | 12/2009 | Selvig et al. |
| D608,518 S | 1/2010 | Luebke |
| D608,622 S | 1/2010 | Zhu |
| 7,673,886 B2 | 3/2010 | Ondrasik |
| 7,679,522 B2 | 3/2010 | Carpenter |
| 7,741,808 B2 | 6/2010 | Fowler et al. |
| 7,766,347 B2 | 8/2010 | Ryan et al. |
| 7,780,902 B2 | 8/2010 | Pruitt, Jr. et al. |
| D623,374 S | 9/2010 | Splain et al. |
| 7,793,948 B2 | 9/2010 | Splain et al. |
| 7,837,205 B2 | 11/2010 | Simard |
| D628,759 S | 12/2010 | Walter |
| 7,849,615 B2 | 12/2010 | Giampavolo |
| 7,871,051 B2 | 1/2011 | Schuermann et al. |
| 7,887,068 B2 | 2/2011 | Ferguson |
| 7,934,647 B1 | 5/2011 | Mims et al. |
| D639,521 S | 6/2011 | Walter |
| 7,959,166 B2 | 6/2011 | Splain et al. |
| D641,532 S | 7/2011 | Peota et al. |
| D643,175 S | 8/2011 | Peota et al. |
| D644,393 S | 8/2011 | Walter |
| 8,002,290 B2 | 8/2011 | Russell et al. |
| D644,809 S | 9/2011 | Walter |
| D644,810 S | 9/2011 | Peota et al. |
| D645,222 S | 9/2011 | Walter |
| D645,331 S | 9/2011 | Lin |
| D645,631 S | 9/2011 | Walter |
| D646,041 S | 9/2011 | Berthiaume et al. |
| D648,915 S | 11/2011 | Walter |
| D649,732 S | 11/2011 | Muscara |
| 8,052,158 B2 | 11/2011 | Tyrrell |
| 8,056,909 B2 | 11/2011 | Burdwood et al. |
| 8,066,291 B2 | 11/2011 | Cagan et al. |
| D654,242 S | 2/2012 | Berthiaume et al. |
| 8,162,331 B2 | 4/2012 | Simonson et al. |
| D658,841 S | 5/2012 | Walter |
| D659,936 S | 5/2012 | Berthiaume et al. |
| D660,542 S | 5/2012 | Walter |
| 8,245,894 B2 | 8/2012 | Buehler |
| 8,256,651 B2 | 9/2012 | Reynolds |
| 8,256,777 B2 | 9/2012 | Deal et al. |
| D671,292 S | 11/2012 | Long et al. |
| 8,313,114 B1 | 11/2012 | Aron |
| D672,111 S | 12/2012 | Walter |
| D672,933 S | 12/2012 | Fredendall et al. |
| 8,360,441 B2 | 1/2013 | Caruso et al. |
| D681,304 S | 4/2013 | Peter et al. |
| D681,900 S | 5/2013 | Fredendall et al. |
| D683,102 S * | 5/2013 | Muscara' ............... D34/17 |

(56) References Cited

U.S. PATENT DOCUMENTS

| | | |
|---|---|---|
| D685,972 S | 7/2013 | Walter |
| 8,534,520 B1 | 9/2013 | Liparoti |
| D692,201 S | 10/2013 | Walter |
| D693,981 S | 11/2013 | Walter |
| D696,483 S | 12/2013 | Otterlee et al. |
| 8,602,373 B2 | 12/2013 | Beckey et al. |
| D698,114 S | 1/2014 | Smith et al. |
| 8,632,080 B2 | 1/2014 | Russell et al. |
| D700,762 S | 3/2014 | Walter |
| D702,910 S | 4/2014 | Long et al. |
| 8,690,166 B2 | 4/2014 | Peota et al. |
| D707,011 S | 6/2014 | Peter et al. |
| 8,827,281 B2 | 9/2014 | Smith |
| D722,856 S | 2/2015 | Shah et al. |
| 8,991,836 B2 | 3/2015 | Walter et al. |
| D733,388 S | 6/2015 | Stauff et al. |
| 9,085,314 B2 | 7/2015 | Selvig et al. |
| D742,612 S | 11/2015 | Walter |
| 9,215,859 B2 | 12/2015 | Jakubowski |
| D751,264 S | 3/2016 | Walter |
| 9,271,474 B2 | 3/2016 | Jakubowski |
| 9,321,473 B2 | 4/2016 | Kiser, III |
| D760,464 S | 6/2016 | Dyer et al. |
| D763,536 S | 8/2016 | Walter et al. |
| 9,485,956 B2 | 11/2016 | Jakubowski et al. |
| 9,604,757 B2 | 3/2017 | Spivack et al. |
| 9,637,152 B2 | 5/2017 | Dyer et al. |
| 9,676,406 B1 | 6/2017 | Kocurek et al. |
| 9,694,840 B2 | 7/2017 | Hendrick et al. |
| D794,897 S | 8/2017 | Dyer et al. |
| D800,986 S | 10/2017 | Magnusson |
| D806,506 S | 1/2018 | Shah |
| D806,976 S | 1/2018 | Peota et al. |
| D813,486 S | 3/2018 | Stauff et al. |
| 9,953,362 B2 | 4/2018 | Argue et al. |
| D818,237 S | 5/2018 | Walter et al. |
| 9,994,245 B2 | 6/2018 | Hendrick et al. |
| 10,040,469 B2 | 8/2018 | Bacallao et al. |
| 10,058,197 B2 | 8/2018 | Bacallao et al. |
| 10,137,919 B2 | 11/2018 | Winton et al. |
| 10,150,493 B1 | 12/2018 | Harsley |
| D838,929 S | 1/2019 | Villanova et al. |
| 10,173,708 B1 | 1/2019 | Bacallao |
| 10,179,599 B1 | 1/2019 | Lambrecht |
| 10,210,503 B2 | 2/2019 | Sonnendorfer et al. |
| 10,220,866 B2 | 3/2019 | Bacallao et al. |
| 10,259,480 B2 | 4/2019 | Bacallao et al. |
| 10,266,195 B2 | 4/2019 | Bacallao et al. |
| D849,351 S | 5/2019 | Harrison |
| D850,051 S | 5/2019 | Harrison et al. |
| D850,052 S | 5/2019 | Harrison et al. |
| D850,754 S | 6/2019 | Peota et al. |
| 10,336,358 B2 | 7/2019 | Bacallao et al. |
| 10,399,587 B2 | 9/2019 | Bacallao et al. |
| D868,412 S | 11/2019 | Wieth et al. |
| 10,486,725 B2 | 11/2019 | Bacallao |
| D870,412 S | 12/2019 | Harrison et al. |
| 10,494,008 B1 | 12/2019 | Scriba et al. |
| 10,507,858 B2 | 12/2019 | Bacallao |
| 10,507,859 B2 | 12/2019 | Bacallao |
| 10,513,281 B2 | 12/2019 | Bacallao et al. |
| 10,513,282 B2 | 12/2019 | Bacallao et al. |
| D874,779 S | 2/2020 | Wieth et al. |
| 10,556,609 B2 | 2/2020 | Harrison |
| 10,577,007 B2 | 3/2020 | Gasche et al. |
| 10,641,314 B1 | 5/2020 | Fan |
| D895,920 S | 9/2020 | Villanova et al. |
| D905,370 S | 12/2020 | Poirier et al. |
| D914,317 S | 3/2021 | Ebling et al. |
| D914,318 S | 3/2021 | Ebling |
| 10,933,899 B2 | 3/2021 | Harrison et al. |
| 10,949,910 B2 | 3/2021 | Carpenter et al. |
| D926,414 S | 7/2021 | Villanova et al. |
| 11,059,506 B2 | 7/2021 | Hagen et al. |
| 11,155,291 B2 * | 10/2021 | Joaquin ................ B62B 3/1464 |
| D945,246 S | 3/2022 | Michalski |
| D961,357 S | 8/2022 | Grebasch et al. |
| D1,004,893 S | 11/2023 | Irwin |
| D1,049,539 S | 10/2024 | Cheng et al. |
| D1,054,646 S | 12/2024 | Hogan et al. |
| 2002/0135144 A1 | 9/2002 | Murar et al. |
| 2003/0057666 A1 | 3/2003 | Murar |
| 2003/0116933 A1 | 6/2003 | Nadeau et al. |
| 2004/0046341 A1 | 3/2004 | Wilkinson |
| 2004/0090025 A1 | 5/2004 | Frommherz |
| 2005/0082792 A1 | 4/2005 | Gordon et al. |
| 2005/0156406 A1 | 7/2005 | Prather |
| 2005/0212235 A1 | 9/2005 | Hammerling |
| 2005/0241889 A1 | 11/2005 | Nebolon et al. |
| 2006/0097467 A1 | 5/2006 | Solomon et al. |
| 2006/0186621 A1 | 8/2006 | Buckley |
| 2006/0273535 A1 | 12/2006 | O'Quin |
| 2006/0289637 A1 | 12/2006 | Brice et al. |
| 2007/0063463 A1 | 3/2007 | Splain |
| 2007/0063465 A1 | 3/2007 | Splain |
| 2008/0088101 A1 * | 4/2008 | Ferguson ................ B62B 1/14 340/572.1 |
| 2008/0231432 A1 | 9/2008 | Stawar et al. |
| 2008/0237339 A1 | 10/2008 | Stawar et al. |
| 2008/0238009 A1 | 10/2008 | Carpenter |
| 2008/0243626 A1 | 10/2008 | Stawar et al. |
| 2009/0058024 A1 | 3/2009 | Cagan et al. |
| 2009/0092342 A1 | 4/2009 | Rolim de Oliveira |
| 2009/0242717 A1 | 10/2009 | Stonehouse |
| 2009/0301533 A1 | 12/2009 | Caldwell |
| 2010/0276899 A1 * | 11/2010 | Burdwood ............ B62B 3/1468 280/33.991 |
| 2011/0062675 A1 | 3/2011 | Brown et al. |
| 2012/0067474 A1 | 3/2012 | Fellema |
| 2013/0307235 A1 | 11/2013 | Smith et al. |
| 2013/0307239 A1 | 11/2013 | Smith et al. |
| 2013/0313297 A1 | 11/2013 | Belby et al. |
| 2013/0341370 A1 | 12/2013 | Larson |
| 2014/0021698 A1 | 1/2014 | Beckman et al. |
| 2014/0159327 A1 | 6/2014 | Smith et al. |
| 2014/0265184 A1 | 9/2014 | Lorenzo et al. |
| 2015/0053652 A1 | 2/2015 | Peters et al. |
| 2015/0246751 A1 | 9/2015 | Spivack et al. |
| 2016/0046313 A1 | 2/2016 | Landwehr |
| 2017/0328094 A1 | 11/2017 | Zia et al. |
| 2018/0370554 A1 | 12/2018 | Raza et al. |
| 2019/0039636 A1 | 2/2019 | Bacallao et al. |
| 2019/0071109 A1 | 3/2019 | Bacallao et al. |
| 2019/0126965 A1 | 5/2019 | Bacallao et al. |
| 2019/0210625 A1 | 7/2019 | Harrison |
| 2019/0329810 A1 | 10/2019 | Gasche et al. |
| 2020/0139998 A1 | 5/2020 | Harrison |
| 2020/0164909 A1 | 5/2020 | Webert et al. |
| 2020/0211088 A1 | 7/2020 | Stawar et al. |
| 2020/0216105 A1 | 7/2020 | Mcmurtrey et al. |
| 2020/0223466 A1 | 7/2020 | Sherman et al. |
| 2020/0247451 A1 | 8/2020 | Streicher |
| 2021/0221417 A1 | 7/2021 | Cazares |
| 2022/0111883 A1 | 4/2022 | Yuan |
| 2023/0143479 A1 | 5/2023 | Hagen |
| 2023/0146179 A1 | 5/2023 | Hagen |
| 2023/0147385 A1 | 5/2023 | Hagen |
| 2024/0132130 A1 | 4/2024 | Pedersen |
| 2024/0132132 A1 | 4/2024 | Pedersen |
| 2024/0140511 A1 | 5/2024 | Pedersen |
| 2024/0140513 A1 | 5/2024 | Pedersen |
| 2024/0343284 A1 | 10/2024 | Fitzwater et al. |

FOREIGN PATENT DOCUMENTS

| | | |
|---|---|---|
| DE | 29505145 U1 | 6/1995 |
| EP | 1962209 A2 | 8/2008 |
| EP | 2590848 B1 | 6/2015 |
| EP | 2590530 B1 | 11/2016 |
| IN | 210446 | 6/2009 |
| WO | 1998005542 A1 | 2/1998 |
| WO | 2005068274 A1 | 7/2005 |

(56) References Cited

FOREIGN PATENT DOCUMENTS

| WO | 2012072912 A1 | 6/2012 |
|---|---|---|
| WO | 2014144880 A2 | 9/2014 |
| WO | 2016044414 A1 | 3/2016 |

OTHER PUBLICATIONS

Have you used Target's new wonderful shopping carts in Texas yet?, article published Aug. 22, 2023, https://knue.com/did-you-see-targets-wonderful-new-shopping-carts-have-made-it-to-texas/ (Year: 2023).

U.S. Appl. No. 18/383,834, filed Oct. 25, 2023, Sara L. Pedersen.

"File:Shopping Cart with Baby Seat", printed from https://commons.wikimedia.org/wiki/File:Shopping_Cart_with_Baby_Seat.jpg, publicly available at least as early as Sep. 13, 2020 (4 pages).

"Rabtrolley Plastic Trolley" printed from https://www.rabtrolley.com/?I=en, publicly available as early as Feb. 5, 2016, per the Internet Archive Wayback Machine at https://web.archive.org (3 pages).

"Safe-Dock Infant Seat Carrier", printed from https://premiercarts.com/BS_Safe-Dock.html Page, publicly available at least as early as Aug. 30, 2015 per the Internet Archive Wayback Machine at https://web.archive.org (2 pages).

"Safe-Seat, Elite Infant Seat" printed from https://premiercarts.com/BS_SS-Plus.html, publicly available as early as Jun. 16, 2013, per the Internet Archive Wayback Machine at https://web.archive.org (2 pages).

U.S. Appl. No. 29/857,746, filed Oct. 25, 2022 (12 pages).

U.S. Appl. No. 29/857,751, filed Oct. 25, 2022 (20 pages).

U.S. Appl. No. 18/383,848, filed Oct. 25, 2023, and claims priority to Oct. 25, 2022 (38 pages).

U.S. Appl. No. 18/383,860, filed Oct. 25, 2023, and claiming priority to Oct. 25, 2022 (35 pages).

U.S. Appl. No. 18/383,865, filed Oct. 25, 2023, and claims priority to Oct. 25, 2022 and Oct. 26, 2022 (43 pages).

U.S. Appl. No. 18/383,870, filed Oct. 25, 2023, and claims priority to Oct. 25, 2022 and Oct. 27, 2022 (36 pages).

U.S. Appl. No. 29/857,743, filed Oct. 25, 2022 (17 pages).

U.S. Appl. No. 29/857,763, filed Oct. 25, 2022 (10 pages).

U.S. Appl. No. 29/857,773, filed Oct. 25, 2022 (10 pages).

U.S. Appl. No. 29/857,775, filed Oct. 25, 2022 (17 pages).

U.S. Appl. No. 29/857,777, filed Oct. 25, 2022 (17 pages).

U.S. Appl. No. 29/857,778, filed Oct. 25, 2022 (19 pages).

U.S. Appl. No. 29/857,781, filed Oct. 25, 2022 (47 pages).

U.S. Appl. No. 29/857,782, filed Oct. 25, 2022 (4 pages).

U.S. Appl. No. 29/857,771, filed Oct. 25, 2022 (10 pages).

GOOGLE About This Image / Herman Miller Ubi Bag Hook, date published Sep. 12, 2017 [online], [site visited Jun. 11, 2025]. Available from Internet, URL: < https://tinyurl.com/mv3nusz5> (Year: 2017).

GOOGLE About This Image / Premier Carts Apfs All Polymer Large Full Size Plastic Retail Shopping Carts, date published 05/30/3030 [online], [site visited Jul. 22, 2025]. Available from internet, URL: < https://tinyurl.com/yjyedxuu> (Year: 2020).

GOOGLE About this Image/ REHABMART Accessories for Crocodile Gait Trainer, date published Oct. 2, 2021 [online], [site visited Jun. 30, 2025] Available from Internet, URL https://tinyurl.com/4x5mrb8r> (Year 2021).

\* cited by examiner

SHOPPING CART WITH BAG SUPPORT SYSTEM

CROSS-REFERENCE TO RELATED APPLICATION

This non-provisional utility application is related to and claims priority under 35 U.S.C. 119 (e) to U.S. Provisional Patent Application No. 63/419,321, filed Oct. 25, 2022, which is incorporated herein by reference.

BACKGROUND OF THE INVENTION

Stores around the world maintain fleets of shopping carts to facilitate a customer's selection, transport, and purchase of goods within those stores. Over many decades, the shape and size of shopping carts have changed to meet different models of shopping. Retailers devote considerable resources to shaping a customer's experience within a retail store to make shopping easier, more comfortable, and attractive. The impact of shopping carts on that experience is often overlooked. For example, a full shopping cart of bagged purchased items oftentimes takes up more room in the shopping cart than before it was bagged, which can create spillage from the shopping cart, a lack of space within the shopping cart, or other issues in transporting the groceries from the point of sale to one's vehicle or other mode of transportation away from the retailer. This typical result may limit the amount of goods a consumer is able to purchase as it is generally difficult for a user to employ multiple carts in their shopping experience. In other instances, even if the amount of goods is not limited, a retail store guest may be frustrated or inconvenienced by difficulty safely re-stacking or otherwise repositioning the purchased goods back into the shopping cart following purchase.

Still further, loading a shopping cart with bags of groceries or other items regularly presents a danger of crushing delicate groceries and/or cause damage to other fragile items. The dangers of damaging purchased goods can be increased when plastic, fabric, or other fairly flexible bags are used. The flexible sides of such bags typically allow more shifting or other movement of goods within the bags when the bags are placed within or transported within the cart, which sometimes results in products falling out of the bags. Given their high profile in the retail environment and their impact on the experience of the consumer, improvements in shopping carts are desired to better meet the needs and wants of consumers, especially in fast-moving, retail cultures.

SUMMARY

A shopping cart comprises a wheeled base and a basket. The basket is supported above a wheeled base and includes two or more walls and a hook. The basket defines a compartment between the two or more walls, a top mouth open to the compartment, and an open slot positioned below the top mouth. The open slot is defined between a top edge and a bottom edge thereof, and the bottom edge is positioned opposite the top edge. The hook downwardly depends from the top edge of the open slot toward the bottom edge of the open slot to a free bottom end of the hook. The hook is configured to selectively receive a handle of a bag after the handle of the bag is wrapped around a portion of the basket that is defined between the open slot and the top mouth of the compartment, such that the bag selectively hangs along an outside surface of the basket opposite the compartment. Other shopping carts, portions thereof, and shopping cart assemblies and methods of use are also described herein.

BRIEF DESCRIPTION OF THE DRAWINGS

Embodiments of the invention will be described with respect to the figures, in which like reference numerals denote like elements, and in which.

DETAILED DESCRIPTION

Figure 1:
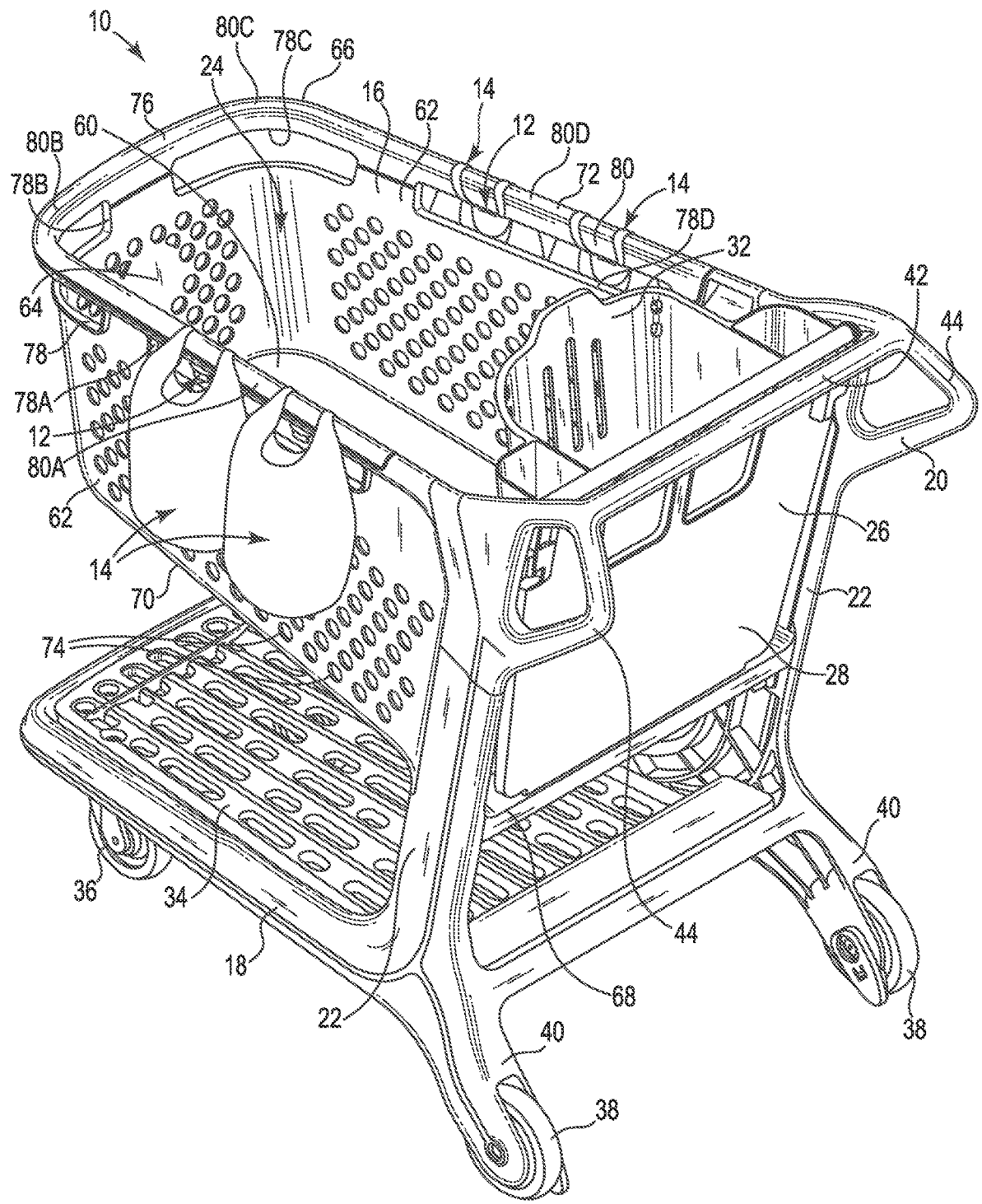
FIG. 1 is a perspective view illustration of a shopping cart with bags hanging therefrom, according to an embodiment of the invention.

The following detailed description of the invention provides example embodiments and is not intended to limit the invention or the application and uses of the invention. Furthermore, there is no intention to be bound by any theory presented in the preceding background of the invention or the following detailed description of the invention. Relational terms herein such a first, second, top, bottom, etc. may be used herein solely to distinguish one entity or action from another without necessarily requiring or implying an actual such relationship or order. Directional terminology, such as "front," "back," "leading," or trailing is used with reference to the orientation in the figure(s) being described. Any directional terminology is used for purposes of illustration and is in no way limiting. In addition, as used herein, the terms "about" or "substantially" apply to all numeric values or descriptive terms, respectively, and generally indicate a range of numbers or characteristics that one of skill in the art would consider equivalent to the recited values or terms, that is, having the same function or results.

Embodiments of the invention are directed to a shopping cart including a bag support system for hanging one or more bags from the shopping cart. The shopping cart enables a consumer to shop for items within a store, placing those items in the shopping cart as the consumer moves through the store. In one embodiment, a shopping cart comprises a wheeled base, a basket, and a handle. The support system is place near a top of the basket and provides hooks for hanging a handled bag form the shopping cart, for example, so that any bags hung from the hooks hang along a sidewall of the basket. In one example, hanging bags on sides of the basket decreases storage size constraints of the basket while also decreasing chances for items within cart to be crushed or otherwise damaged.

In one aspect, a top or perimeter handle forms a substantially continuous or non-continuous loop or side bar extending above an upper edge of the basket to enable steering the cart from the front, sides or rear of the cart. The perimeter handle may extend around all, substantially all, or a smaller portion or portions of the top edge of the body of the cart basket, as will be apparent to those of skill in the art upon reading this application. In one example, the perimeter handle, whether continuous or discontinuous, is an ergonomic cart control arrangement providing a panoramic grasping zone, in which the cart can be maneuvered from sides of the cart in addition to a typical rear handle of the cart. The additional handle enhances a consumer's ability to push, pull, or turn the cart while walking (or standing) at a front, side, or rear of the cart.

In one example, the hooks of the bag storage system extend downwardly from a side bar handle, for instance, in a void formed between the side bar handle and a top of the basket in a manner allowing one or more handles or other portion(s) of a storage bag to be wrapped around the side bar handle and placed on the hook. In this manner, a storage bag secured by each hook allows the storage bag to hang along a sidewall of the basket. In one embodiment, the hook extends downwardly with an outward curve, that is, a curve away from an interior of the basket, in a manner configured to hold a storage bag along an exterior of the sidewall of the basket, thereby, freeing up additional space within the basket for other items, goods, etc.

Figure 2:
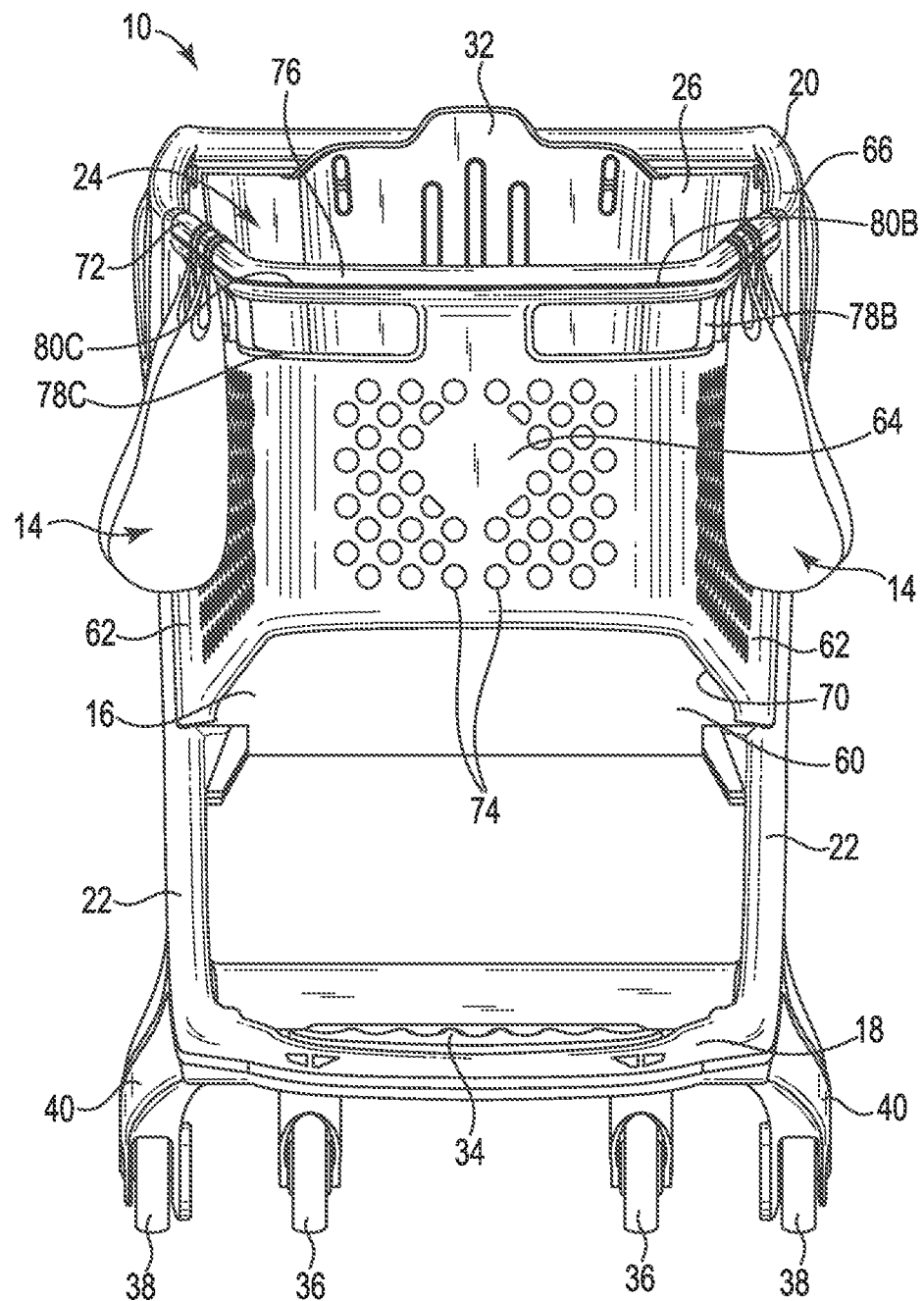
FIG. 2 is a front view illustration of the shopping cart of FIG. 1 with bags hanging therefrom, according to an embodiment of the invention.
Figure 3:
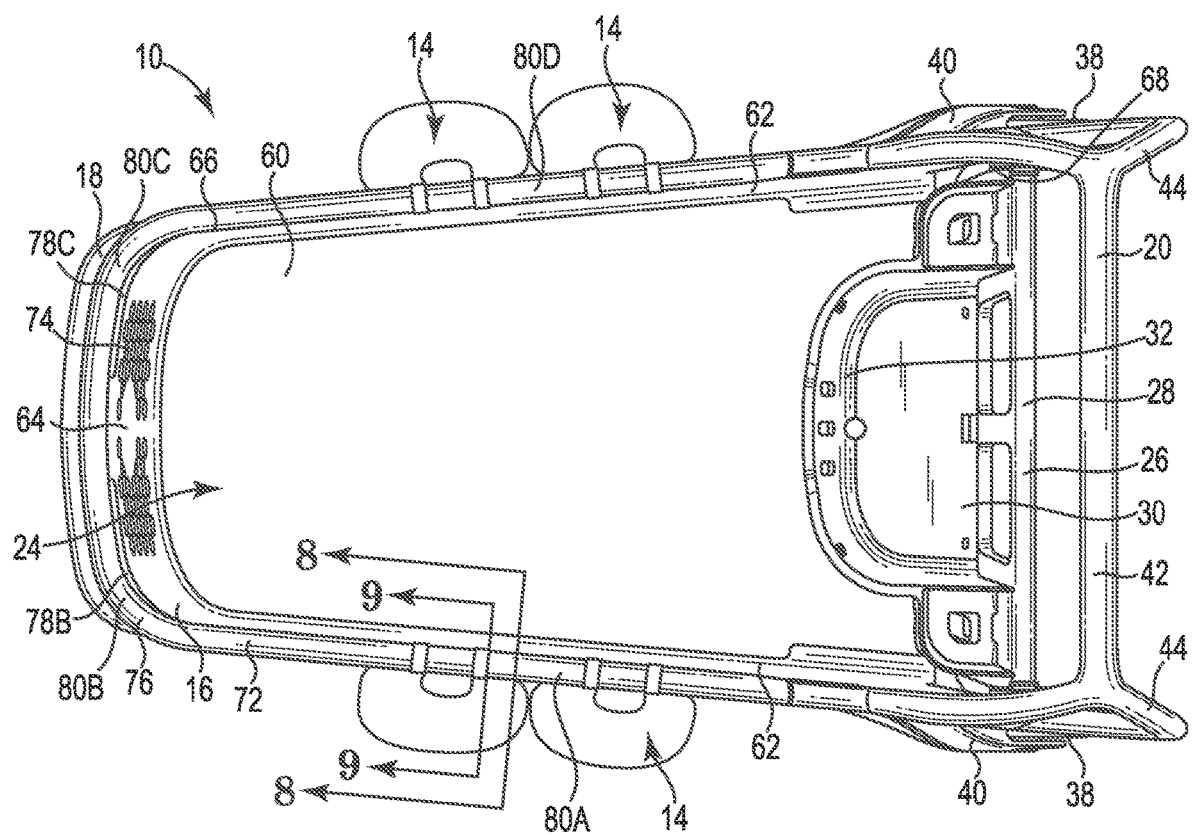
FIG. 3 is a top view illustration of the shopping cart of FIG. 1 with bags hanging therefrom, according to an embodiment of the invention.
Figure 4:
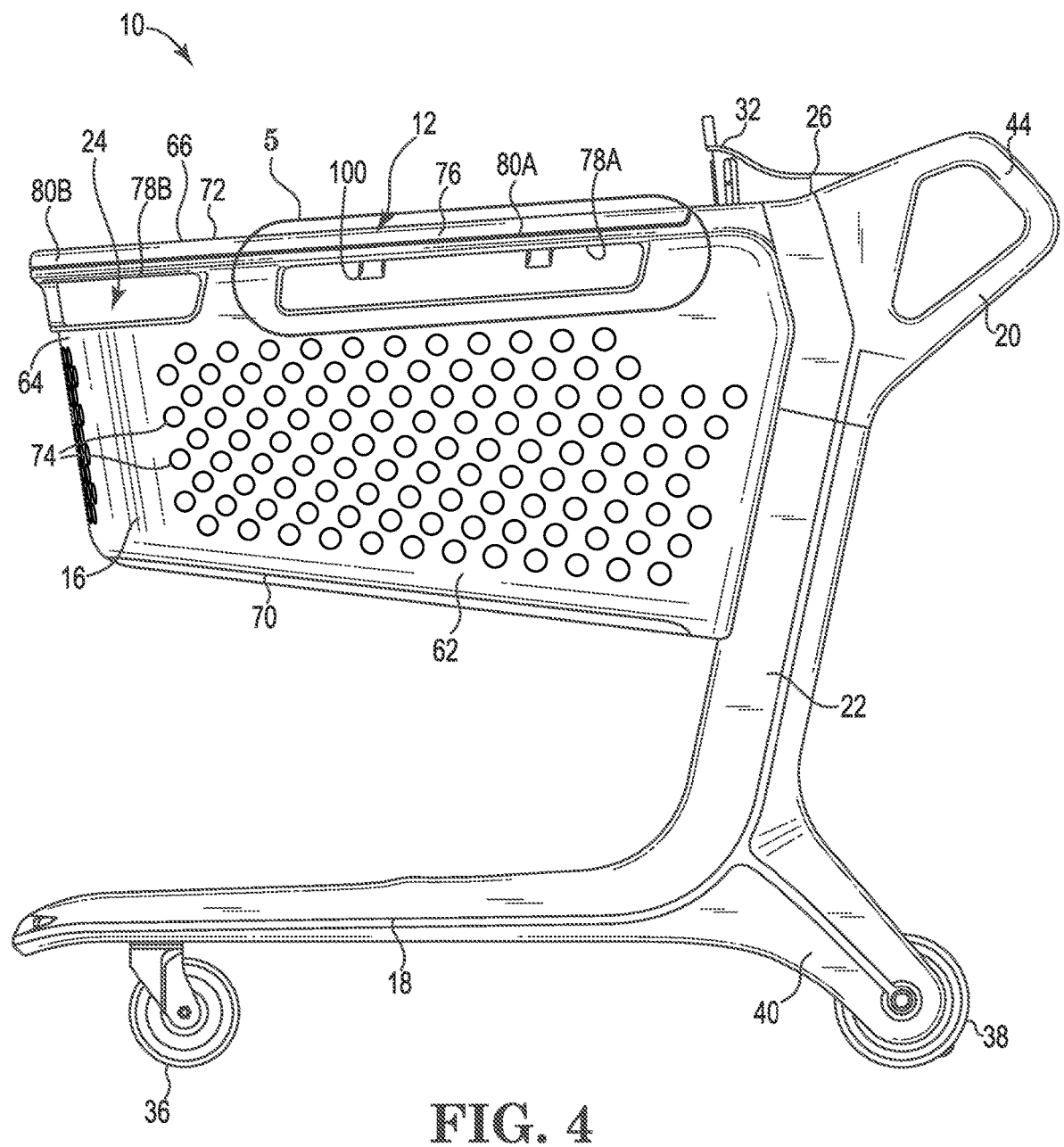
FIG. 4 is a right-side view illustration of the shopping cart of FIG. 1, according to an embodiment of the invention.

Turning to the figures, FIGS. 1-3 illustrate a shopping cart 10, according to one embodiment of the invention, forming a bag support system 12 together with one or more bags 14 hung from shopping cart 10. For example, shopping cart 10 selectively supports the one or more bags 14 therefrom to assist a consumer in moving through a store or other shopping venue with items placed in one or both of shopping cart 10 and the one or more bags 14 for transport to another location, for example, around a store and eventually to a check-out counter of the store for possible item purchase. As illustrated, shopping cart 10 comprises a basket 16, a wheeled base 18, and a handle assembly 20. Basket 16 cantilevers forwardly over wheeled base 18 supported by two support masts 22, which each extend upwardly and, in one example, slightly rearwardly from a rear portion of wheeled base 18 to handle assembly 20. Basket 16 forms a compartment 24 open to a top of basket 16 thereof for receiving and selectively maintaining items for transport. Wheeled base 18 supports the rest of shopping cart 10 allowing shopping cart 10 to be readily pushed and/or pulled to induce movement of shopping cart 10 as desired, for instance, through a retail store or other venue. In one example, handle assembly 20 is positioned at least partially on an outside of basket 16 forming a contact surface that is easily grasped by a user to assist a user in pushing and pulling shopping cart 10 in a desired direction.

As used herein and illustrated in the drawings, the front of shopping cart 10 is the portion of basket 16 that generally leads shopping cart 10 during forward movement of shopping cart 10 induced by a user pushing on handle assembly 20 toward basket 16 from a position on shopping cart 10 opposite basket 16, and the rear of shopping cart 10 is the trailing portion of basket 16 our outside basket 16 opposite front of shopping cart 10 during the above-described forward movement of shopping cart 10, for example, including handle assembly 20.

In one example, shopping cart 10 includes a gate and seat assembly 26 supported on one of support masts 22, basket 16, rear handle assembly 20, or other portion of shopping cart 10. Seat assembly 26 is, in one embodiment, positioned at a rear end of basket 16, for example, selectively closing off an otherwise open rear end of basket 16. Gate and seat assembly 26 includes a gate 28 and, in one example, a seat 30 configured to selectively provide seating for a small child and/or to receive smaller items, such as a user's bag or purse, small items for purchase, etc. As illustrated, gate 28 is rotatably coupled with a top of basket 16 in a manner allowing gate 28 to rotate about the coupling to selectively, substantially cover a rear of compartment 24 and/or to extend into and/or above rear compartment 24. In one aspect, gate and seat assembly 22 is configured to be pivoted upward within basket 16 to enable nesting multiple carts 10 together as will be apparent to those of skill in the art upon reading the present application. Gate 28 and seat 30 may be formed as a single, integral member or may be formed as separate pieces coupled to one another. In one example, seat 30 extends forwardly from gate 28 to cantilever from gate 28 into and/or over a portion of compartment 24 of basket 16. Seat 30 can be formed in a variety of manners, in one example, to define a backrest 32 of seat 30 generally opposite a rear surface of gate 28.

In one embodiment, wheeled base 18 supports a tray 34, front wheels 36, and rear wheels 38 via legs 40 to allow shopping cart 10 to be pushed and/or otherwise be rolled to various locations in a retail store on front wheels 36 and rear wheels 38. In one embodiment, handle assembly 20 is mounted at a rear and upper portion of basket 16 to facilitate maneuvering cart 10.

In one embodiment, each of handle assembly 20, basket 16, and base 18 are separately made exclusively of a plastic or other moldable material. This arrangement enables a lightweight cart while providing numerous structural, performance, and ergonomic functions. In another embodiment, one or more of handle, basket 16, base 18, or additional components of shopping cart 10 is/are made of a material other than a plastic material, such as metal or other suitable materials as will be apparent to those of skill in the art. In one embodiment, each of handle assembly 20, basket 16, and base 18 is made from the same one or different ones of a nylon material, a high-density polyethylene (HDPE) material, or other moldable materials or mixtures of moldable materials and/or other non-moldable materials. Still further, use of wire, metal, or any other materials to completely or partially form any one or more of handle assembly 20, basket 15, and base 18 are also contemplated as will also be apparent to those of skill in the art upon reading this application.

As shown in FIGS. 1-11, in one embodiment, rear handle assembly 20 comprises a laterally extending handle 42 extending between two side handles 44, which each rearwardly extending from one or both of support masts 22 and/or basket 16. Each of laterally extending handle 42 and the two side handles 44 provide easily grasped surfaces to facilitate the ease in which a user can push, pull, and/or otherwise manipulate movement of shopping cart 10 via rotation and/or swiveling of wheels 36 and 38 of base 18.

In one embodiment, basket 16 includes a bottom panel 60, side panels 62, and a front panel 64 and may further define an open top or mouth 66 of basket 16 and/or a rear open side 68 of basket 16. For example, bottom panel 60 forms a bottom shape of shopping cart 10 and a bottom perimeter of compartment 24. In one example, bottom panel 60 is tapered long side edge thereof such that bottom panel is formed in a frustro-triangular shape although other shapes of bottom panel 60 are also contemplated. Basket 16 maybe be formed as several pieces coupled together or, as shown in the figures, as a single, unitary molded member.

Each of side panels 62 is generally rectangular or otherwise generally quadrilateral in shape, in one example, each extending from an opposite side edge of bottom panel 60 upwardly to define the side boundaries of compartment 24. Front panel 64, which may be any suitable shape such as a rectangular shape, extending upwardly from a front edge of bottom panel 60 and between front edges of each of side panels 62. In this manner, each of side panels 62 and front panel 64 define a bottom edge 70 thereof and extend upwardly from the corresponding bottom edge 70 to a corresponding upper edge 72, opposite bottom panel 60 and the corresponding bottom edge 70.

Each of bottom panel 60, side panels 62, and front panel 64 may be continuously formed between its bottom edge 70 and upper edge 72 and/or may be discontinuously formed in a suitable manner, for example, in a manner including a plurality of apertures 74 formed therein. In one example, apertures 74 are sized, shaped, and spaced in a manner that does not encourage items of typical size to fall through the apertures 74, but that decreases the amount of plastic or other moldable material, wired material, or other material needed to define bottom panel 60, side panels 62, and/or front panel 64, as will be apparent to those of skill in the art upon reading this application.

In one example, each of bottom panel 60, side panels 62, and front panel 64 are one of substantially planar and/or just slightly flexed in a convex manner relative to compartment 24. Basket 16 may transition in an abrupt sharp corner manner between bottom panel 60 and side panels 62 and/or front panel 64 and/or between front panel 64 and each of side panels 62 or may transition in a curvilinear, smooth manner, e.g., as shown in the figures. In this manner, bottom panel 60, side panels 62, and front panel 64 not only substantially define basket 16, but also compartment 24 therebetween such that compartment 24 is open at a top or mouth 66 of basket 16 and/or at a rear side 68 opposite front panel 64.

As illustrated in FIGS. 1, 2, 4, 5, and 8, for example, just below upper edge 72 of basket 16, one or more elongated slots 78 are defined extending in one or both of a lateral or longitudinal directions. In one embodiment, basket 16 defines slots 78A, 78B, 78C, and 78D vertically positioned below upper edges 72 but nearer upper edges 72 than bottom panel 60, for example, positioned within about a top quarter of the height of basket 16. In one embodiment, such as that illustrated in the figures, basket 16 defines bridges 77, each extending between two adjacent ones of slots 78A, 78B, and 78C to connect portions of side panels 62 and front panel 64 below slots 78A, 78B, and 78C to upper edges 72 of basket 16.

In one example, shopping cart 10 additionally includes a perimeter frame or cap 76 extending about mouth 66 of basket 16, covering top edges 72 of side panels 62 and front panel 64. In one example, basket top edge 72 of basket 16 is substantially continuous about mouth 66. In this manner, in one example, perimeter cap 76 is generally adjacent each of slots 78A, 78B, 78C, and 78D to form grasping zones 80, for example 80A, 80B, and 80C, respectively adjacent one of slots 78A, 78B, and 78C, where a user can wrap her hand around perimeter cap 76 and top upper edge 72 of basket 16, though the adjacent one of slots 78A, 78B, or 78C to grasp perimeter cap 76 in a manner allowing the user to move shopping cart 10 at least small amounts side to side and/or front to back on front and rear wheels 36 and 38.

In one example, each of slots 78 are generally rectangular in shaped or shaped in another suitable manner, as will be apparent to those of skill in the art upon reading the present application. Each slot 78 includes a top edge or boundary 90, a bottom edge or boundary 92, and opposing side edges or boundaries 94 in one embodiment. In one example, each of top edge 90, bottom edge 92, and opposing side edges 94 include a rim or flange 96 facing inwardly toward slot 78, that is, a portion of rim 96 along top edge 90 and a portion of rim 96 along bottom edge 92 face each other and portions of rim 96 along opposing side edges 94 face each other. Portions of basket 16 extend above each of slots 78, including extending in the space between each of slots 78 and top cap 76. In one example, each of top edge 90, bottom edge 92, and side edges 94 are formed entirely by basket 16, and in one example, basket 16 is molded as a single piece.

Bag support system 12, in one example, includes one or more hooks 100 depending downwardly from top edge 90 down into the corresponding one of slots 78 terminating short of bottom edge 92. In one example, hook 100 is molded as single piece with the rest of basket 16, such that basket 16 at least partially defines bag support system 12. While in another embodiment, such as that illustrated in FIG. 8, each hook is formed as an integral molded part of perimeter cap 76 and is configured to extend through top edge 90 and into the corresponding one of slots 78, as will be further described below. Other means of forming hooks 100 will be apparent to those of skill in the art upon reading the present application.

Figure 5:
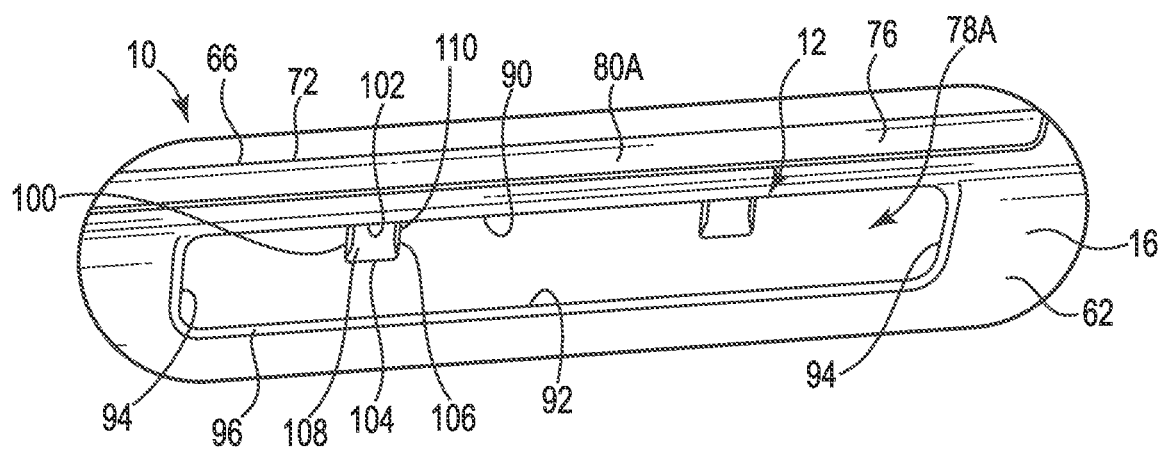
FIG. 5 is a detail view illustration of a portion of the shopping cart of FIG. 4 taken about the area indicated by "5" in FIG. 4, according to one embodiment of the present invention.
Figure 6:
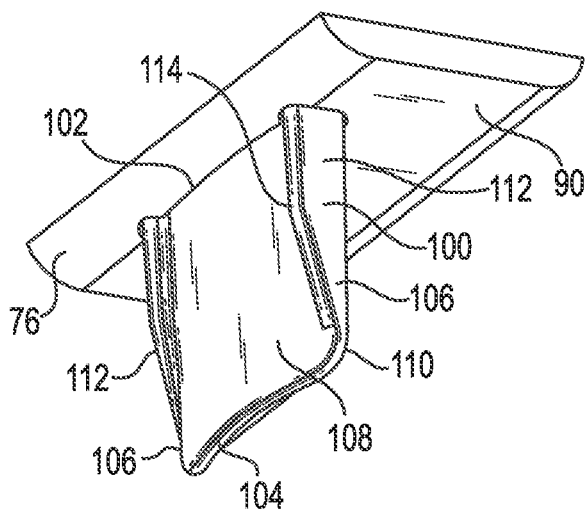
FIG. 6 is a partial detail view illustration of a portion of the shopping cart including a bag hook of FIGS. 1, 2, 4, and 5, according to one embodiment of the present invention.
Figure 7:
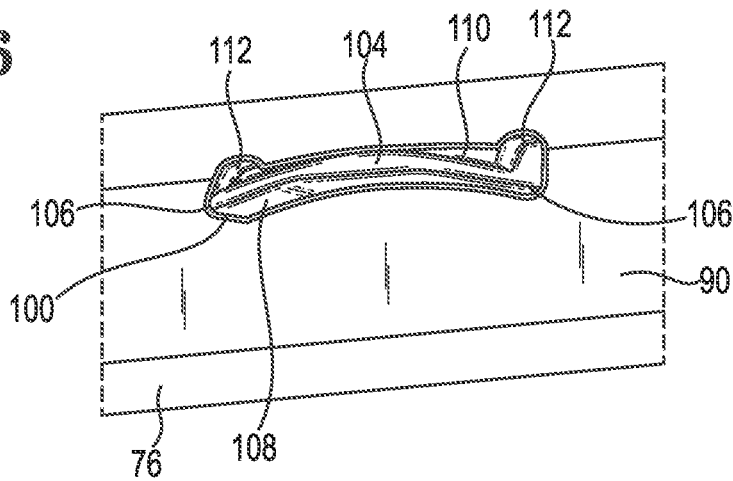
FIG. 7 is a bottom view illustration of the portion of the shopping cart shown in FIG. 6, according to one embodiment of the present invention.

Regardless of how each hook 100 is formed, that is an integral part of basket 16, perimeter cap 76, and/or other portion of shopping cart 10, referring to FIGS. 5-7, in one embodiment, each hook 100 defines a top end 102 adjacent top edge 90 of a corresponding slot 78, and a bottom end 104 opposite top end 102. Hook 100 extends from top end 102 to bottom end 104, for example, a free bottom end 104 having a width defined between opposite depending sides 106 thereof. In one example, hook 100 defines an exterior surface 108 facing away from compartment 24 of basket 16 and an interior surface 110 facing inwardly toward compartment 24 of basket 16. Each of exterior surface 108 and interior surface 110 may be substantially planar or may be curved, for example, such that interior surface 110 is concave and exterior surface 108 is convex, that is such that hook 100 generally is bowed such that a longitudinal center line of hook 100 extends further toward an exterior than opposite depending sides 106 thereof.

In one embodiment, side fins 112 are defined by hook 100 to extend from at least a portion of a length of each of opposite depending sides 106 in an exterior direction away from compartment 24. Side fins 112 provide additional rigidity and robustness to hook 100, in one example. In one embodiment, each of side fins 112 extends generally parallel with the corresponding one of opposite depending sides 106 as it extends downwardly from top edge 90 to an intermediate point 114 where side fin 112 begins to taper inwardly toward the corresponding one of opposite depending sides 106. A distance each hook 100 extends between top end 102 and bottom end 104 is sufficient to receive a portion of one of bags 14 looped therearound (for example, see FIG. 11) in a manner that generally prevents or at least decreases the chances the one of bags 14 inadvertently slips from hook 100, as will be described in additional detail below.

Figure 8:
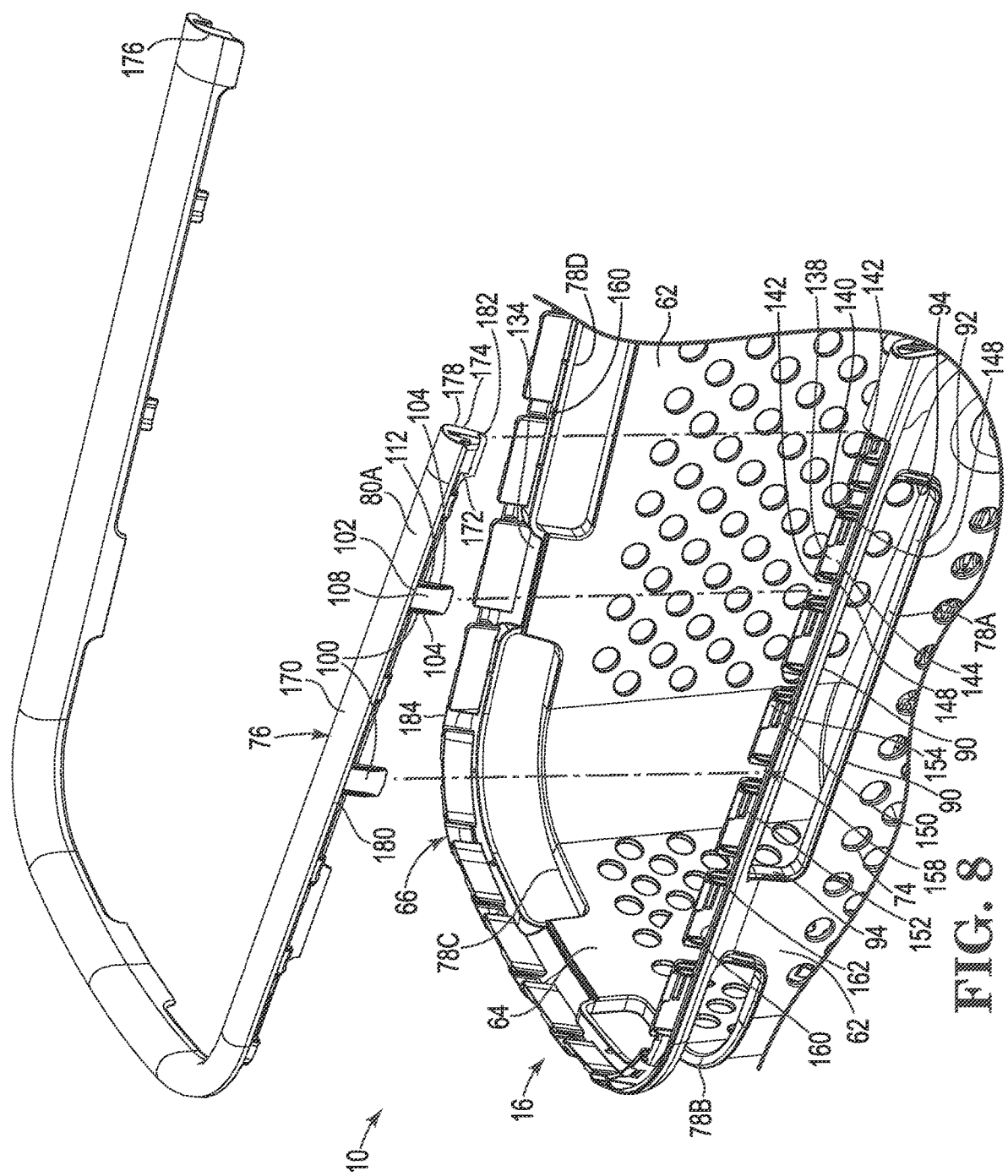
FIG. 8 is a partial exploded view illustration of the shopping cart of FIG. 1, according to one embodiment of the present invention.
Figure 9:
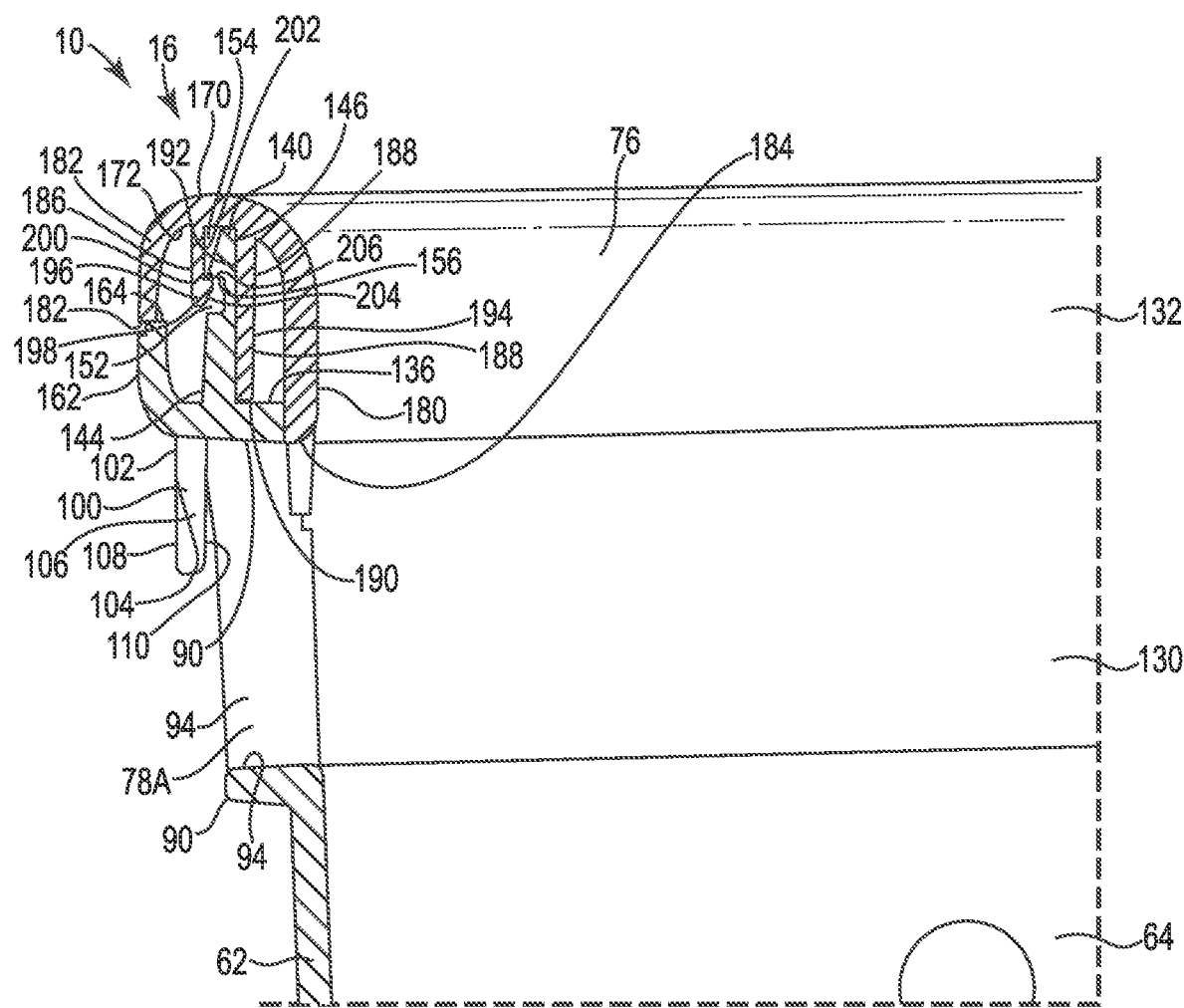
FIG. 9 is a partial cross-sectional view illustration taken from line 9-9 in FIG. 3, according to one embodiment of the present invention.
Figure 10:
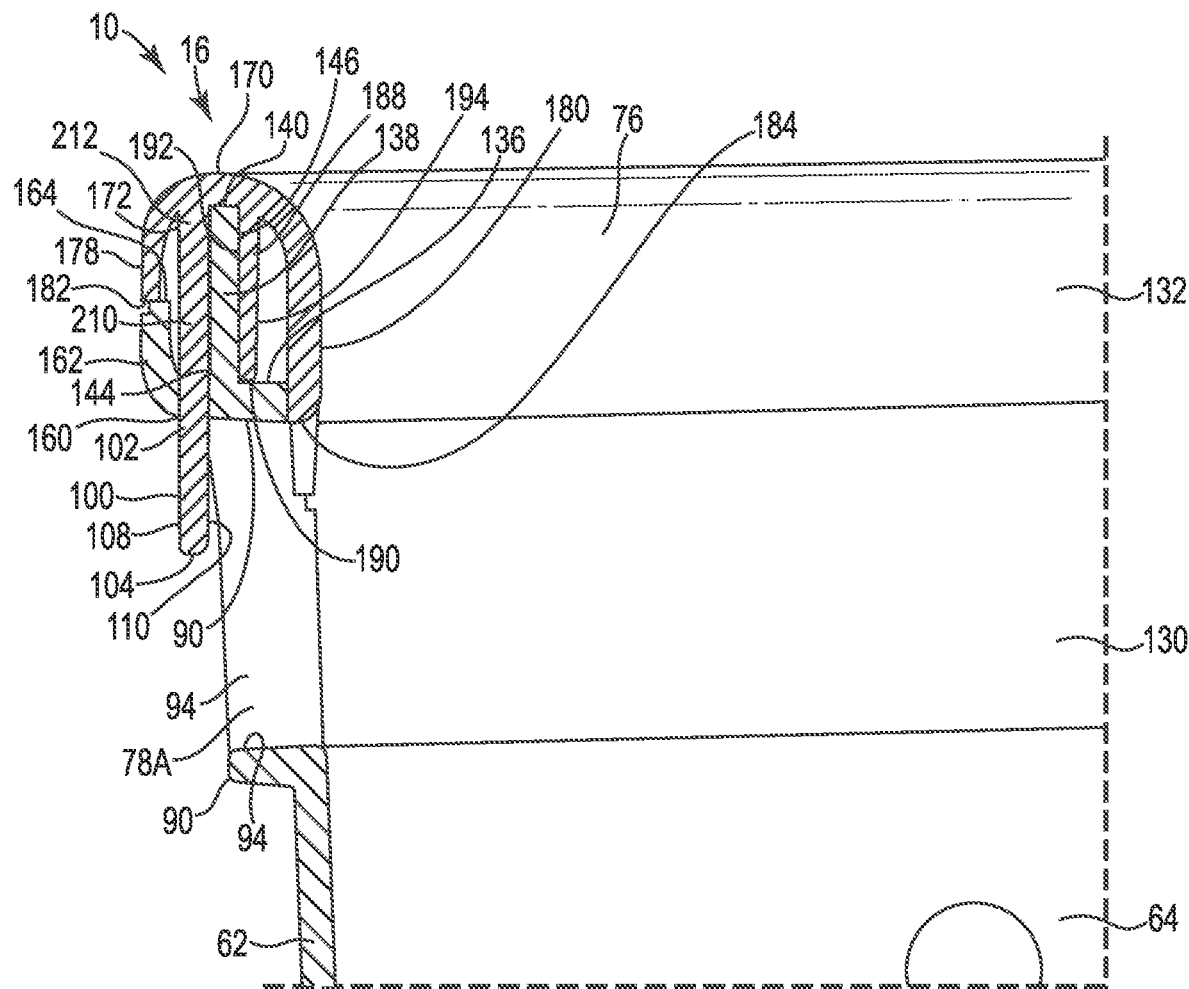
FIG. 10 is a partial cross-sectional view illustration taken from line 10-10 in FIG. 3, according to one embodiment of the present invention.
Figure 11:
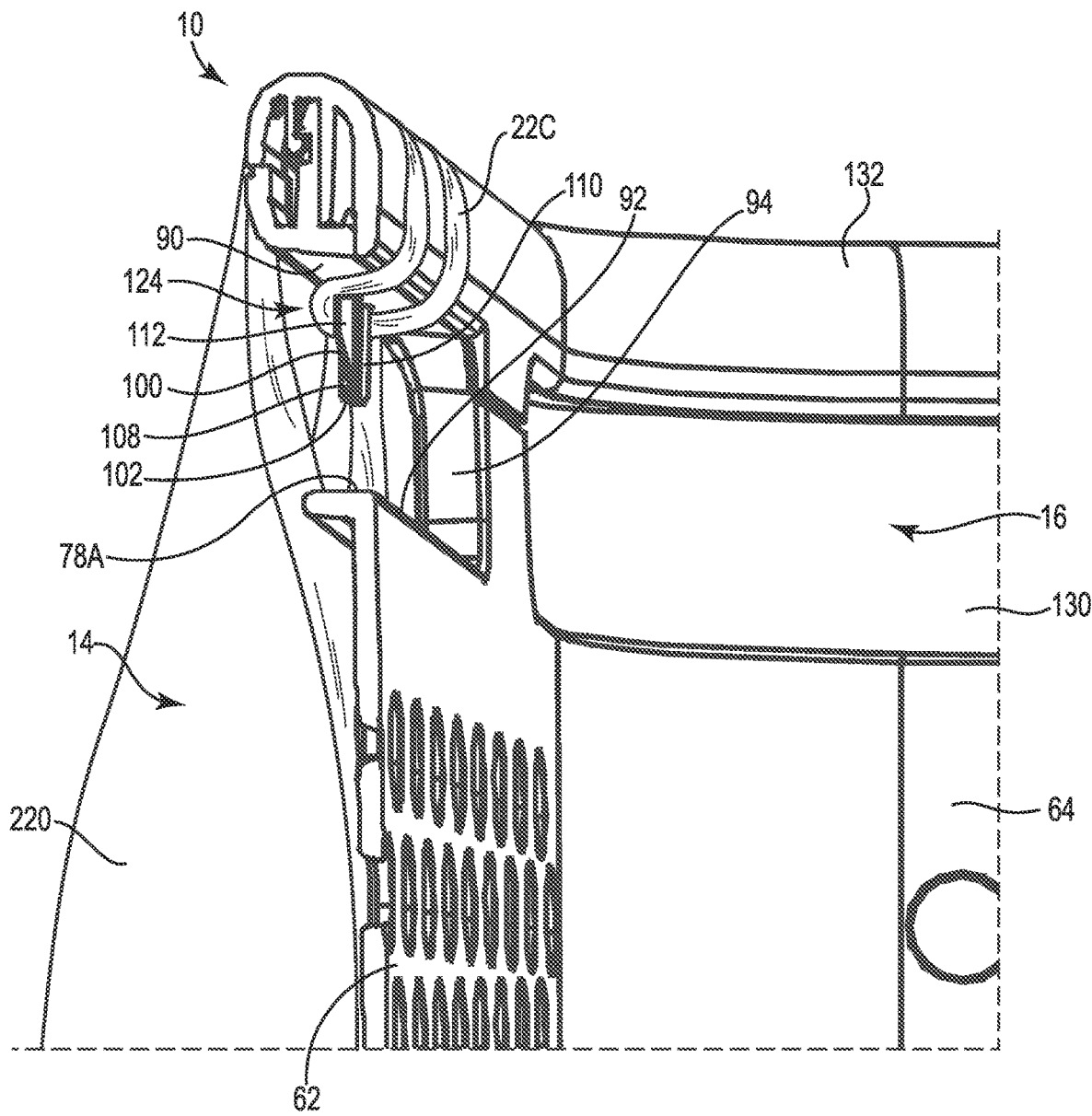
FIG. 11 is a partial cross-sectional view illustration taken along a line similar to 10-10 in FIG. 3 with a bag hung on the bag hook, according to one embodiment of the present invention.

While hooks 100 can be formed to depend from a top surface near a top of basket 16 in any variety of manners, one example assembly is illustrated with additional reference to FIGS. 8-10, in which hooks 100 are formed as part of perimeter cap 76, extend through a top portion of basket 16 and into a corresponding slot 78. More specifically, as shown in FIG. 8, basket 16 includes a body 130 and perimeter cap 76. Body 130 of basket 16 defines an upper edge 134 terminating in a top self or top edge 136 (see e.g., FIGS. 9-10) that is generally horizontal in nature, in one example. Generally, vertically extending fins 138 protrude upwardly from a mid or near to mid portion of top edge 136 to an uppermost, free edge 140 between two opposing side edges 142 forming an exterior-facing surface 144 and an interior-facing surface 146 therebetween facing away from each other. In one example, each of fins 138 includes a strengthening rib 148 extending along one or both of opposing side edges 142.

In one example, one or more of fins 138 includes coupling features 150 to facilitate coupling with perimeter cap 76. Per one embodiment, coupling features 150 include a ramped surface 154, a detent 152, and a return 156. Ramped surface 154 extends away from free edge 140 toward top edge 136 and angles outwardly away from compartment 24 of basket 16. At the lower termination of ramped surface 154, detent 152 is formed in a manner inwardly offset from the lower termination of ramped surface 154 and positioned below ramped surface 154. Return 156 is protrudes in an exterior direction away from detent 152 on an opposite side of detent 152 relative to ramped surface 154 and is configured to act as a stop for perimeter cap 76, as will be further described below.

Fins 138 may collectively extend around a substantial entirety of mouth 66 of basket 16 in a substantially continuous fashion or, per the embodiment illustrated in FIG. 8, be intermittently formed such that spaces or gaps 158 are formed between fins 138. In one embodiment, fins 138 are formed to extend from a portion of top edge 136 such that top edge 136 defines an interior rim 162 on an interior side of fins 138 and an exterior rim 162 on an opposite, exterior side of fins 138. In one example, through slots or apertures 160 are formed through top edge 136, for instance, through interior rim 162 from top edge 136 to, that is, into communication with, the adjacent slot 78, such as slot 78A, 78B, and 78C. Each aperture 160 is sized and shaped to allow one of hooks 100 from perimeter cap 76 to pass therethrough and into the adjacent slot 78 during assembly of cart 10.

One embodiment of perimeter cap 76 defines a top surface 170 and an opposite, bottom side 172 forming perimeter cap 76 in a substantially U-shape extending between a first end 174 and second end 176. The cross-section of perimeter cap 76 generally is in an inverted U-shape, for example, an asymmetrical, inverted U-shape to define an exterior side wall 178 opposite an interior side wall 180 each terminating in a downward extension to exterior bottom edge 182 and interior bottom edge 184, respectively, of perimeter cap 76, in one embodiment. As shown in the cross-sectional view of FIG. 9, perimeter cap 76 may additionally include one or more coupling features 186 and an interior wall 188 each extending downwardly from a middle portion of perimeter cap 76 between interior side wall 180 and exterior side wall 78. Interior wall 188, in one embodiment, includes a bottommost or free edge 190, an exterior-facing surface 192, and an interior-facing surface 194 opposite exterior-facing surface 192, for example, forming interior wall 188 in a substantially planar manner.

Coupling features 186, according to one example, defines a bottommost or free edge 198, an exterior-facing surface 200, and an interior-facing surface 202 opposite exterior-facing surface 192. In one example, each coupling feature 186 includes a ramped surface 204, inclined to extending inwardly as it extends upwardly form free edge 196 to form a catch 196 sized and shaped to be received in detent 152, and a cut back or return forming interface, upwardly facing surface 206. In one example, coupling features 186 are intermittently spaced along an underside of perimeter cap 76 and/or are interposed between intermittently spaced depending fingers 210 (e.g., FIG. 10), which extend in a substantially planar manner from a first or top end 212 immediately adjacent an underside of perimeter cap 76, in one example, to facilitate alignment of perimeter cap 76 with basket 16 and terminate in forming hook 100 to depend below top edge 90 of a corresponding slot 78 upon assembly of shopping cart 10.

During assembly of cart 10, perimeter cap 76 is secured adjacent upper edge 134 of basket 16, in a manner wrapping around fins 138 to create a smooth, rounded top perimeter of shopping cart 10 about mouth 66 of basket 16. Perimeter cap 76 is sized to fit around three sides of mouth 66 in a manner covering at entirety of a top of body 130 of basket 16, in one example. In one embodiment, perimeter cap 76 is configured to be substantially, for example, entirely, coupled with body 130 via snap and/or compression fit without need for additional coupling members or devices.

For example, as illustrated in FIGS. 8-10, perimeter cap 76 is aligned with top edges of body 130 extending around three of four edges adjacent mouth 66. Perimeter cap 76 is then pushed down atop body 130, for instance, in a manner placing hooks 100 to align with and move through apertures 160 in upper edge 134 as best shown in FIG. 10 and to move coupling features 150 of fins 138 into interaction and securement with coupling features 186 of perimeter cap 76.

According to embodiments of the present inventions, a shopping cart includes hooks of a bag storage system extending downwardly from a side bar handle, for instance, in a void formed between the side bar handle and a top of the basket in a manner allowing one or more handles or other portion(s) of a storage bag to be wrapped around the side bar handle and placed on the hook. In this manner, a storage bag can be secured by each hook such that the storage bag hangs along a sidewall of the basket. In one embodiment, the hook extends downwardly with an outward curve, that is, a curve away from an interior of the basket, in a manner configured to hold a storage bag along an exterior of the sidewall of the basket, thereby, freeing up additional space within the basket for other items, goods, etc.

Although the invention has been described with respect to particular embodiments, such embodiments are meant for illustrative purposes only and should not be considered to limit the invention. Various alternatives and changes will be apparent to those of ordinary skill in the art upon reading this application. Other modifications within the scope of the invention and its various embodiments will be apparent to those of ordinary skill.

What is claimed is:

1. A shopping cart comprising:
   a wheeled base; and a basket supported above the wheeled base, wherein the basket includes:
  two or more walls defining a compartment between the two or more walls, a top mouth open to the compartment, and an open slot positioned below the top mouth, wherein the open slot is defined between a top edge and a bottom edge thereof, the bottom edge being positioned opposite the top edge, and
  a hook downwardly depending from the top edge of the open slot toward the bottom edge of the open slot to a free bottom end of the hook,
  wherein the hook is configured to selectively receive a handle of a bag after the handle of the bag is wrapped around a portion of the basket that is defined between the open slot and the top mouth of the compartment, such that the bag selectively hangs along an outside surface of the basket opposite the compartment, and
  the hook depends downwardly from the top edge of the open slot with an inward curvature toward the compartment of the body.

2. The shopping cart of claim 1, wherein the hook is coupled to a remainder of the basket only along the top edge of the open slot.

3. The shopping cart of claim 1, wherein the hook depends downwardly from the top edge of the open slot to a free bottom edge of the hook positioned above and spaced from the bottom edge of the open slot.

4. The shopping cart of claim 1, wherein the hook is injection molded as a single piece with the perimeter cap, the hook extending through a hole in the body into the open slot.

5. A shopping cart comprising:
a wheeled base; and
a basket supported above the wheeled base, wherein the basket includes:
  two or more walls defining a compartment between the two or more walls, a top mouth open to the compartment, and an open slot positioned below the top mouth, wherein the open slot is defined between a top edge and a bottom edge thereof, the bottom edge being positioned opposite the top edge, and
  a hook downwardly depending from the top edge of the open slot toward the bottom edge of the open slot to a free bottom end of the hook,
wherein:
  the portion of the basket at least partially defines a perimeter handle around the top mouth of the compartment, the perimeter handle is configured to be grasped by a user to facilitate manipulating movement of the shopping cart, and the top edge of the open slot is formed by the perimeter handle, and
  the hook is configured to selectively receive a handle of a bag after the handle of the bag is wrapped around a portion of the basket that is defined between the open slot and the top mouth of the compartment, such that the bag selectively hangs along an outside surface of the basket opposite the compartment.

6. The shopping cart of claim 5, wherein the basket defines a body below the perimeter handle, the body defines a majority of the compartment, and the bottom edge of the open slot is formed by the body.

7. The shopping cart of claim 6, wherein the top edge of the open slot is formed by the body, and a perimeter cap is coupled to a top of the body to at least partially define the perimeter handle.

8. A shopping cart comprising:
a wheeled base; and
a basket supported above the wheeled base, wherein the basket includes:
  two or more walls defining a compartment between the two or more walls, a top mouth open to the compartment, and an open slot positioned below the top mouth, wherein the open slot is defined between a top edge and a bottom edge thereof, the bottom edge being positioned opposite the top edge, and
  a hook downwardly depending from the top edge of the open slot toward the bottom edge of the open slot to a free bottom end of the hook,
wherein:
  the hook is configured to selectively receive a handle of a bag after the handle of the bag is wrapped around a portion of the basket that is defined between the open slot and the top mouth of the compartment, such that the bag selectively hangs along an outside surface of the basket opposite the compartment,
  the hook depends downwardly from the top edge of the open slot to a free bottom edge of the hook positioned above and spaced from the bottom edge of the open slot, and
  the basket includes a body and a perimeter handle extending at least partially along a top edge of the body to form the at least one open slot between the body and the perimeter handle.

9. The shopping cart of claim 8, wherein the body and at least a portion of the perimeter handle are each separately formed, injection molded plastic pieces coupled to one another to form the open slot between them.

10. The shopping cart of claim 9, wherein the at least a portion of the perimeter handle is a perimeter cap forming a top of the perimeter handle.

11. The shopping cart of claim 10, wherein the perimeter cap includes the hook, and the body defines the open slot.

12. The shopping cart of claim 9, wherein the at least a portion of the perimeter handle includes the hook, which depends through an opening in the body down into the open slot.

13. The shopping cart of claim 12, wherein the hook depends downwardly from the top edge of the open slot with an inward curvature toward the compartment of the body.

14. A shopping cart comprising:
a wheeled base; and
a basket supported above the wheeled base, wherein the basket includes:
  two or more walls defining a compartment between the two or more walls, a top mouth open to the compartment, and an open slot positioned below the top mouth, wherein the open slot is defined between a top edge and a bottom edge thereof, the bottom edge being positioned opposite the top edge, and
  a hook downwardly depending from the top edge of the open slot toward the bottom edge of the open slot to a free bottom end of the hook,
wherein:
  the hook is configured to selectively receive a handle of a bag after the handle of the bag is wrapped around a portion of the basket that is defined between the open slot and the top mouth of the compartment, such that the bag selectively hangs along an outside surface of the basket opposite the compartment, and
  the hook includes outwardly extending side fins on opposing edges thereof providing additional rigidity to the hook.

15. A shopping cart assembly comprising:
a shopping cart including:

a wheeled base, and
a basket supported above a wheeled base, wherein the basket includes:
two or more walls defining a compartment between the two or more walls, a top mouth open to the compartment, and an open slot positioned below the top mouth, wherein the open slot is defined between a top edge and a bottom edge thereof, the bottom edge being positioned opposite the top edge, and
a hook downwardly depending from the top edge of the open slot toward the bottom edge of the open slot to a free bottom end of the hook; and
a bag having a handle, wherein the handle of the bag is wrapped around a portion of the basket that is defined between the open slot and the top mouth of the compartment, such that the bag selectively hangs along an outside surface of the basket opposite the compartment;
wherein the hook has an inward curvature toward the compartment.

16. The shopping cart assembly of claim 15, wherein the bag handle wraps from the outside surface over a top of the top mouth and through the open slot to be received by the hook.

17. The shopping cart assembly of claim 15, wherein the bag is filled with retail items recently purchased from a retail store.

18. A shopping cart assembly comprising:
a shopping cart including:
a wheeled base, and
a basket supported above a wheeled base, wherein the basket includes:
two or more walls defining a compartment between the two or more walls, a top mouth open to the compartment, and an open slot positioned below the top mouth, wherein the open slot is defined between a top edge and a bottom edge thereof, the bottom edge being positioned opposite the top edge, and
a hook downwardly depending from the top edge of the open slot toward the bottom edge of the open slot to a free bottom end of the hook; and
a bag having a handle, wherein the handle of the bag is wrapped around a portion of the basket that is defined between the open slot and the top mouth of the compartment, such that the bag selectively hangs along an outside surface of the basket opposite the compartment;
wherein the portion of the basket is a perimeter handle extending around an entirety of at least three sides of the top mouth of the compartment.

* * * * *